United States Patent [19]
Song et al.

[11] Patent Number: 6,061,711
[45] Date of Patent: May 9, 2000

[54] EFFICIENT CONTEXT SAVING AND RESTORING IN A MULTI-TASKING COMPUTING SYSTEM ENVIRONMENT

[75] Inventors: Seungyoon Peter Song, Los Altos; Moataz A. Mohamed, Santa Clara; Heonchul Park, Cupertino; Le T. Nguyen, Monte Sereno, all of Calif.; Jerry R. Van Aken; Alessandro Forin, both of Redmond, Wash.; Andrew R. Raffman, Woodinville, Wash.

[73] Assignee: Samsung Electronics, Inc., Seoul, Rep. of Korea

[21] Appl. No.: 08/699,280

[22] Filed: Aug. 19, 1996

[51] Int. Cl.⁷ ........................................................ G06F 9/46
[52] U.S. Cl. .............................................................. 709/108
[58] Field of Search ..................................... 395/650, 678, 395/677, 569, 591; 709/108, 107; 712/228, 244

[56] References Cited

U.S. PATENT DOCUMENTS

| | | | |
|---|---|---|---|
| 3,789,365 | 1/1974 | Jen et al. | 340/172.5 |
| 4,954,948 | 9/1990 | Hira et al. | 364/200 |
| 5,008,812 | 4/1991 | Bhandarkar | 364/200 |
| 5,193,158 | 3/1993 | Kinney et al. | 395/375 |
| 5,390,329 | 2/1995 | Gaertner | 395/650 |
| 5,428,779 | 6/1995 | Allergucci | 395/650 |
| 5,594,905 | 1/1997 | Mital | 395/733 |
| 5,613,114 | 3/1997 | Anderson | 395/678 |
| 5,627,745 | 5/1997 | Flood | 364/131 |
| 5,727,211 | 3/1998 | Gulsen | 395/678 |
| 5,799,143 | 8/1998 | Butt et al. | 395/183.14 |
| 5,799,188 | 8/1998 | Manikundalam et al. | 395/678 |

OTHER PUBLICATIONS

Motorola Inc.,MC68881/MC68882 Use's Manual; p. 6–27, section 6.4.1, 1987.

Borland, Turbo Debugger, version 4.5, User's Guide, Borland International, pp. 67–74, 1994.

*Primary Examiner*—Majid A. Banankhah
*Assistant Examiner*—Sue Lao
*Attorney, Agent, or Firm*—Skjerven, Morrill, MacPherson, Franklin & Friel, L.L.P.; Kent B. Chambers

[57] ABSTRACT

In a multi-tasking computing system environment, one program is halted and context switched out so that a processor may context switch in a subsequent program for execution. Processor state information exists which reflects the state of the program being context switched out. Storage of this processor state information permits successful resumption of the context switched out program. When the context switched out program is subsequently context switched in, the stored processor information is loaded in preparation for successfully resuming the program at the point in which execution was previously halted. Although, large areas of memory can be allocated to processor state information storage, only a portion of this may need to be preserved across a context switch for successfully saving and resuming the context switched out program. Unnecessarily saving and loading all available processor state information can be noticeably inefficient particularly where relatively large amounts of processor state information exists. In one embodiment, a processor requests a co-processor to context switch out the currently executing program. At a predetermined appropriate point in the executing program, the co-processor responds by halting program execution and saving only the minimal amount of processor state information necessary for successful restoration of the program. The appropriate point is chosen by the application programmer at a location in the executing program that requires preserving a minimal portion of the processor information across a context switch. By saving only a minimal amount of processor information, processor time savings are accumulated across context save and restoration operations.

23 Claims, 7 Drawing Sheets

EFFICIENT CONTEXT SAVING AND RESTORING IN A MULTI-TASKING COMPUTING SYSTEM ENVIRONMENT

BACKGROUND OF THE INVENTION

1. Field of the Invention

This invention relates to computing systems and more particularly to context switching operations in a multi-tasking environment having, for example, a multi-processor architecture.

2. Description of the Related Art

Multi-tasking generally involves the concurrent execution of several programs in a computer by, for example, time slicing program execution. Computer users have the impression that the programs are executed in parallel when, in actuality, the computer switches between the programs. When program execution is time sliced, a program runs for a period of time before being "context switched out" (task switched) to run another program.

When resuming a context switched out program, the program should resume execution at the precise location where execution previously ended. In anticipation of later resuming the context switched out program, a processor undergoes a process of saving the state of the program being context switched out prior to the processor loading and running another program. This program state is represented in various memory locations by the state of the processor.

Context switching is transparent to the programmer of the context switched out program because, from the perspective of the programmer, context switching occurs at arbitrary times and thus at arbitrary locations in the program. Additionally, the operating system that implements the context switching does not know the state of the program being context switched out. As a result, all processor state information must be saved when the program is context switched out The processor state information includes all architectural and software visible registers as well as any memory locations that are mapped to addresses known only within the processor such as scratch pad memory.

SUMMARY OF THE INVENTION

For a processor architecture having a large quantity of state information, the conventional method of program context switching involving saving and restoring all processor state information is inefficient and may negatively impact processor performance. The inefficiencies and negative performance impact associated with context switching may be attributed in part to processor operations which require accessing multiple memory locations allocated to processor state information storage and operations that write the processor state information across relatively low bandwidth buses to other memory locations. These same inefficiencies of conventional context switching also negatively impact processor performance during the program restoration process when all of the stored processor state information is transferred back to the processor information state allocated memory locations. These inefficiencies are accumulated during each program context switch. For example, a multimedia signal processor architecture may have a processor state represented by over 7 Kbytes of information in over one hundred (100) registers and memory locations. Each context switch conventionally requires transferring all of this information to a processor state memory storage location.

Reducing negative performance impacts associated with context switching in a multi-tasking system, such as a multimedia system employing a multimedia signal processor, advantageously reduces undesirable delays between execution of programs. This can be especially noticeable when programs are involved in processing large amounts of information such as in a multimedia processing environment The present invention advantageously reduces the amount of processor time needed to context switch between programs. Some points in a program being context switched out require storage of more processor state information in order to successfully resume the program execution at a later time than other points. In one embodiment of the present invention, a multiprocessor architecture allows a processor to request another processor executing a current program to interrupt itself at an appropriate point in anticipation of context switching out the current program. The appropriate point corresponds to a point in the currently executing program which may reduce the amount of processor state information needed for successfully resuming the context switched out program and may not necessarily immediately follow receipt of the context switch request.

In another embodiment of the invention, responsibilities for context saving and restoring functions in a multitasking environment are allocated between a processor and the currently executing application program. In this embodiment, the program is marked, for example with a conditional context switch program instruction, in multiple locations corresponding to points in the program requiring a reduced amount of processor state information for successfully resuming execution of the program. When the program reaches the marked location and a context switch request has been received and detected, the program initiates a response to store only processor state information required for successful resumption of the program. The program should be marked frequently enough to alleviate any noticeable delay between assertion of a context switch request and a responsive context switch.

In another embodiment, the present invention is a process including the steps of executing a first program on a first processor, receiving a context switch request from a second processor, and responding to the context switch request at an appropriate point in the first program, wherein the appropriate point is associated with a marker in the program which indicates a proximate point in the first program requiring a minimal amount of processor state information storage for successful restoration of the program.

In another embodiment, the present invention is a computing system including a first processor in a multi-tasking environment for executing programs having respective pluralities of interspersed context switch markers, and a first memory, coupled to the first processor, allocated to storage of processor state information. The computing system further includes a second memory coupled to the first processor, a context switch request detector operating on the first processor for detecting, after the processor encounters one of the markers in an executing program, a request to context switch out the program, and a context saving module operating on the first processor for responding to a detected context switch request by saving in the second memory processor state information located in the first memory.

BRIEF DESCRIPTION OF THE DRAWINGS

The same feature appearing in multiple figures has the same reference numeral.

DETAILED DESCRIPTION OF THE PREFERRED EMBODIMENTS

The following description of the invention is intended to be illustrative only and not limiting.

Figure 1:
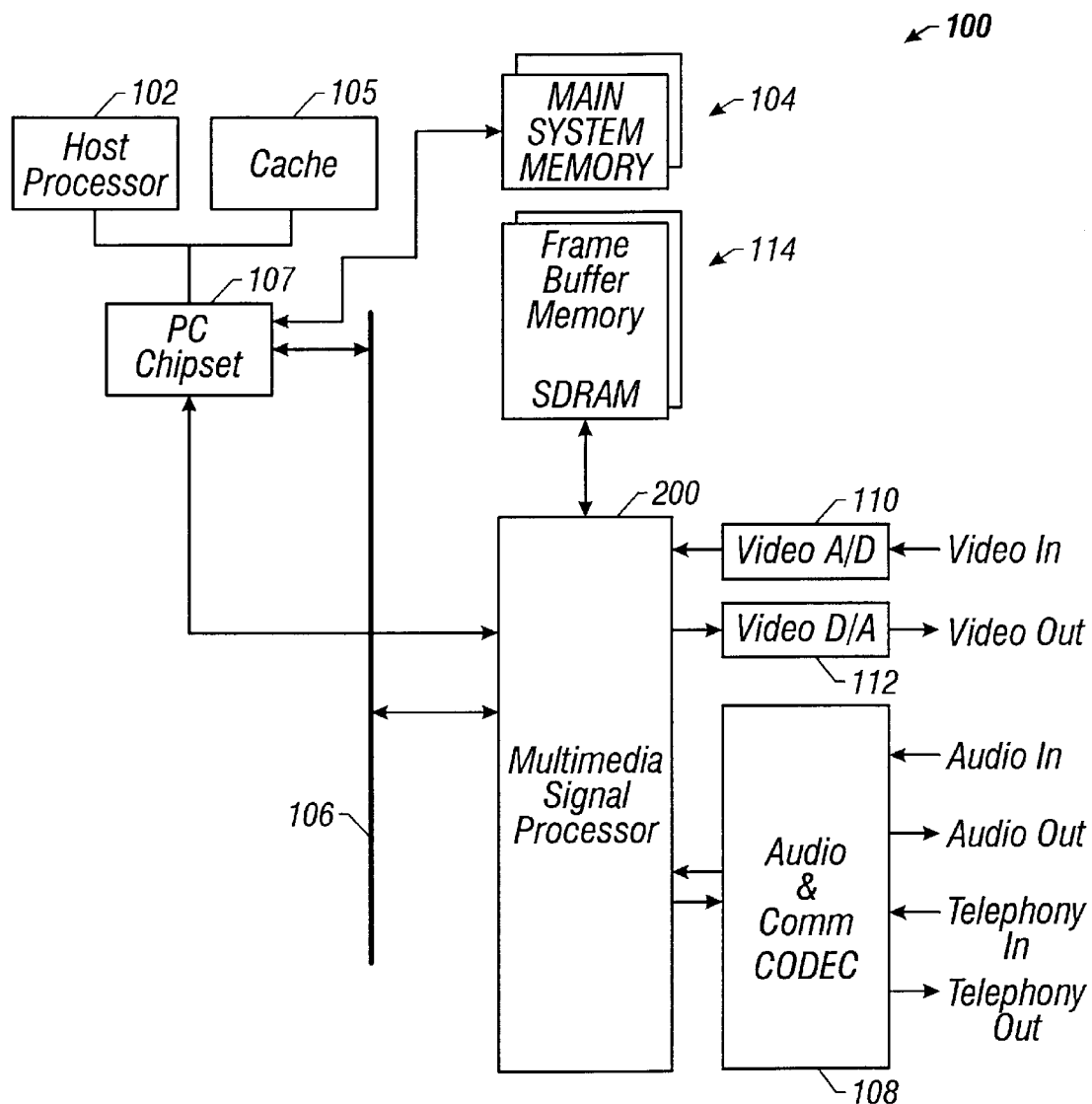
FIG. 1 is a high-level schematic block diagram illustrating a multimedia multiprocessor system in accordance with an embodiment of the present invention.

Referring to FIG. 1, a high-level schematic block diagram illustrates a multimedia multiprocessor system 100 including a host processor 102 and a multimedia signal processor 200. A typical host processor 102 is an x86 processor such as an Intel Corporation Pentium™ or Pentium Pro™ processor. The host processor 102 executes programs based on instructions and data held primarily in a system memory 104 and cache 105. The host processor 102 communicates with the multimedia signal processor 200 via a PC chipset 107 and a system bus 106, such as a PCI bus. The multimedia signal processor 200 interfaces to various functional blocks such as an audio and communication CODEC 108 for receiving audio and telephony communication, a video A/D converter 110 for receiving video input signals, a video D/A converter 112 for transmitting video output signals, and a frame buffer SDRAM memory 114. In one embodiment the multimedia signal processor is any of the Samsung Semiconductor, Inc.'s MSP family of multimedia signal processors (Samsung MSP).

Figure 2:
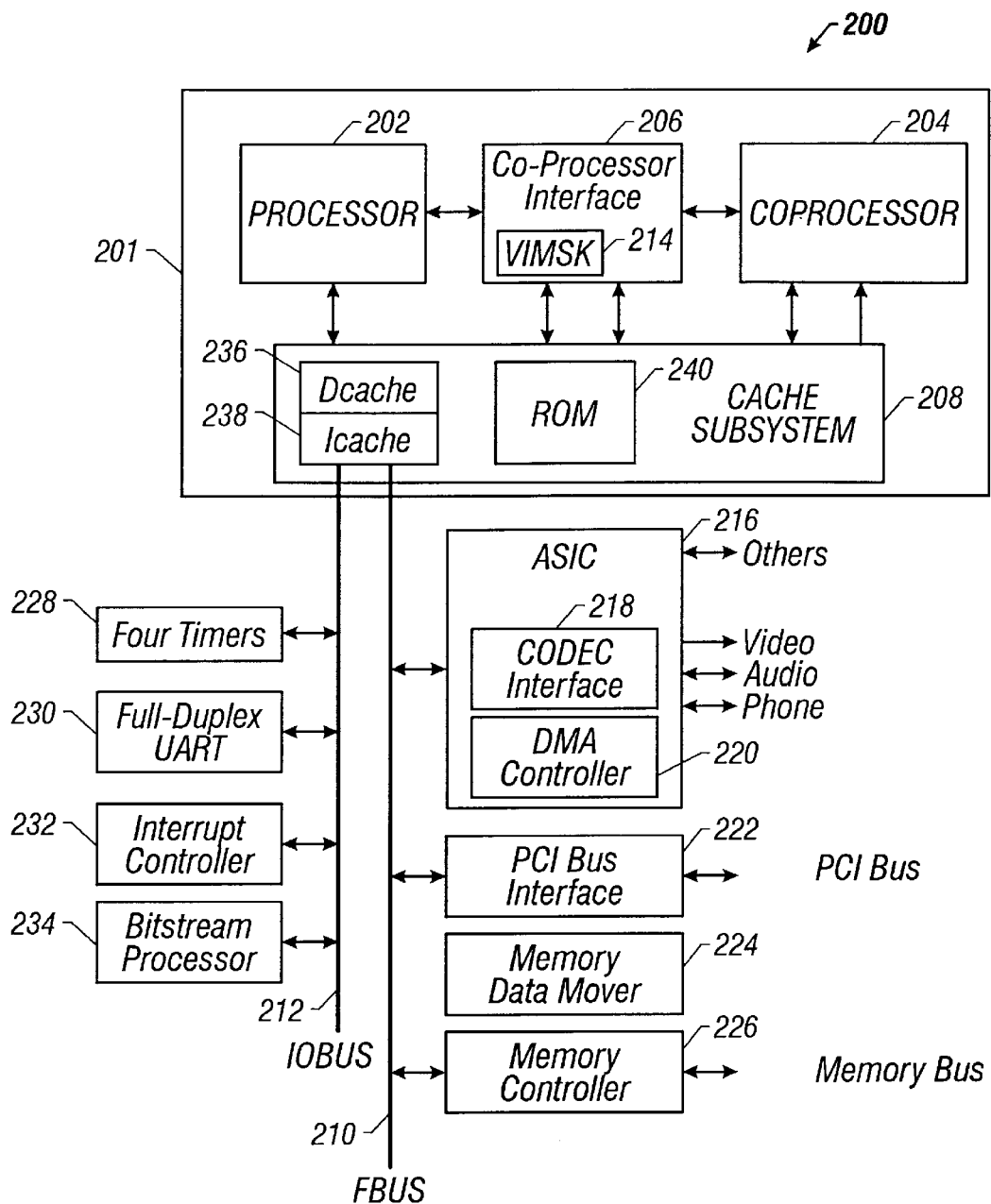
FIG. 2 is a schematic block diagram showing a multimedia signal processor multimedia multiprocessor system illustrated in FIG. 1.

Referring to FIG. 2, a schematic block diagram shows the multimedia signal processor 200 of the multimedia multiprocessor system 100 (FIG. 1). The multimedia signal processor 200 includes a digital signal processor (DSP) core 201 which interfaces via a fast bus (FBUS) 210 to a plurality of FBUS peripherals including, for example, a 32-bit PCI bus interface 222, a 64-bit SDRAM memory controller 226, an 8-channel DMA controller 220, an ASIC logic block 216, and a memory data mover 224 for moving data between the host processor 102 and frame buffer SDRAM memory 114. The PCI bus interface 222 interfaces to the system bus 106 and operates, for example, at 33 MHz. The ASIC logic block 216 furnishes control logic for implementing custom functionality, as desired. The ASIC logic block 216, in one embodiment, supplies 10 Kgates including interfaces to various analog CODECs and customer-specific I/O devices. The memory data mover 224 transfers DMA data from the host processor 102 to SDRAM memory 114 which is local to the multimedia signal processor 200. The DSP core 201 also interfaces via an I/O bus to a plurality of I/O bus devices including, for example, an 8254-compatible programmable interval timer 228, a 16450-compatible UART serial line 230, an 8259-compatible programmable interrupt controller 232, and a bitstream processor 234 for processing a video bitstream. For more information regarding the bitstream processor 234, please refer to co-pending and concurrently filed U.S. patent application Ser. No. 08/699,303 of C. Reader, entitled "Methods and Apparatus for Processing Video Data", which is incorporated herein by reference in its entirety.

The DSP core 201 is the computation engine of the multimedia signal processor 200 and includes a processor 202, a co-processor 204, a cache subsystem 208, the fast bus (FBUS) 210, and the I/O bus 212. In one embodiment, the processor 202 is a 32-bit ARM7™ RISC control processor which performs general processing functions such as context switch enable requests, real-time operating system operations, interrupt and exception handling, input/output device management, communication with the host processor 102 and the like. In one embodiment, the processor 202 operates at 40 MHz. The processor 202 interfaces to the co-processor 204 through a co-processor interface 206.

The processor 202 performs the exception handling in response to exceptions, generally conditions that occur during instruction processing, causing a modification of execution control flow. For more information regarding exception handling, please refer to co-pending and concurrently filed U.S. Patent application Ser. No. 08/699,295 of Song et al., entitled "System And Method For Handling Software Interrupts With Argument Passing" and Ser. No. 08/699,294 of Song et al., entitled "System And Method For Handling Interrupt And Exception Events In An Asymmetric Multiprocessor Architecture" which are incorporated herein by reference in their entirety.

The co-processor 204 is the digital signal processing engine of the multimedia signal processor 200. In one embodiment, co-processor 204 is a vector processor of the Samsung MSP family. As a vector processor, the co-processor 204 has a Single-Instruction Multiple-Data architecture and includes a pipelined RISC engine that operates on multiple data elements in parallel to perform signal processing functions such as Discrete Cosine Transforms (DCT), FIR filtering, convolution, video motion estimation and other processing operations. The co-processor 204 supports vector arithmetic in which multiple data elements are operated upon in parallel, in the manner of a vector process, by a plurality of vector execution units. The co-processor 204 executes both scalar operations and combined vector-scalar operations. The multiple data elements of the co-processor 204 are packed in a 576-bit vector which is computed at a rate of thirty-two 8/9-bit fixed-point arithmetic operations, sixteen 16-bit fixed-point arithmetic operations, or eight 32-bit fixed-point or floating point arithmetic operations per cycle (for example, 12.5 ns). Most 32-bit scalar operations are pipelined at a rate of one instruction per cycle while most 576-bit vector operations are pipelined at a rate of one instruction in two cycles. Load and store operations are overlapped with arithmetic operations and are executed independently by separate load and store circuits.

Figure 3:
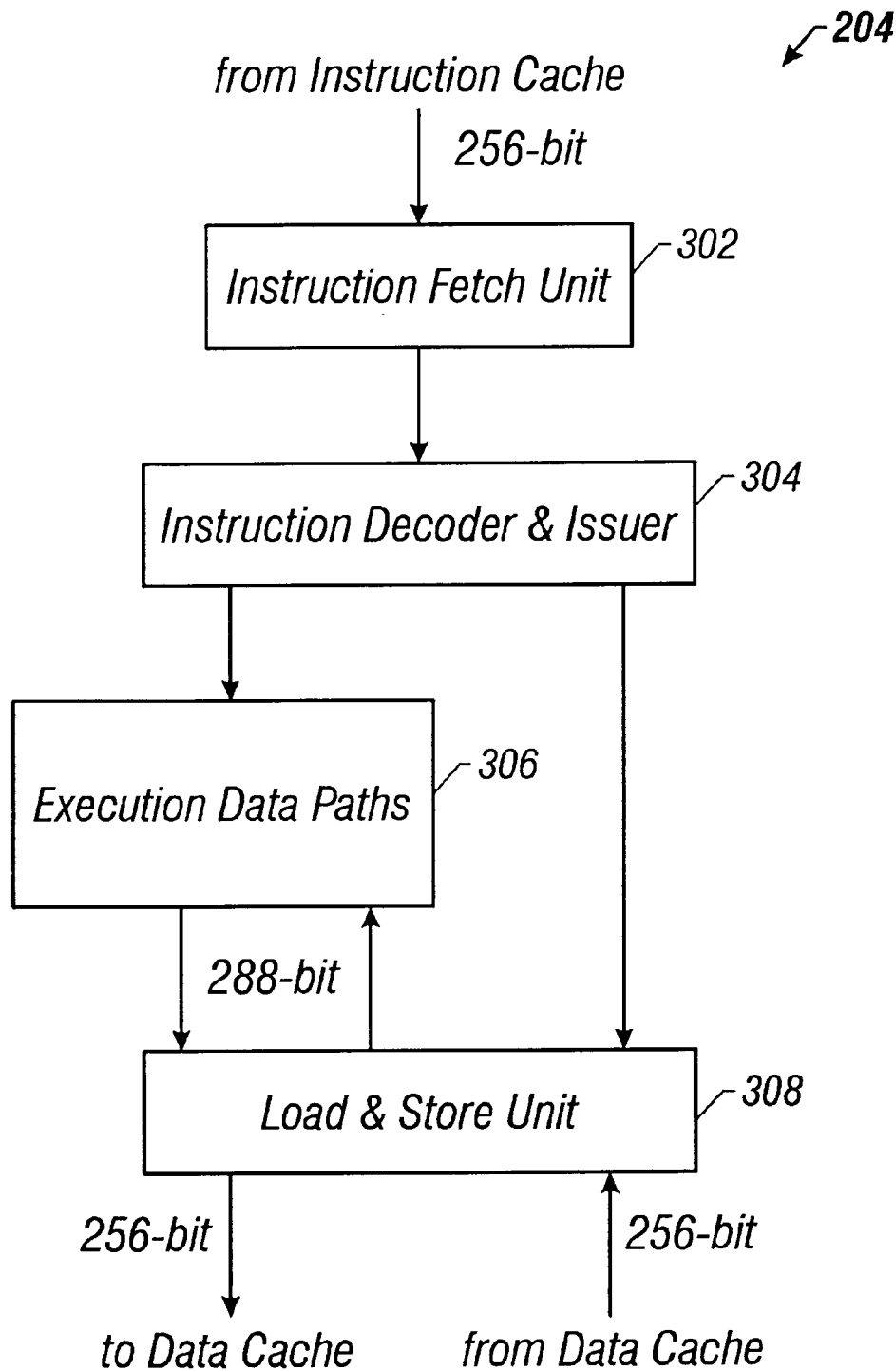
FIG. 3 is a is a schematic block diagram showing a co-processor in the multimedia signal processor illustrated in FIG. 2.

Referring to FIG. 3, the co-processor 204 has four functional blocks including an instruction fetch unit 302, an instruction decoder and issuer 304, an instruction execution data path 306, and a load and store unit 308. The instruction fetch unit 302 and the instruction decoder and issuer 304 are included in the co-processor 204 to allow the co-processor 204 to operate independently of the processor 202.

The instruction fetch unit 302 prefetches instructions and processes control flow instructions such as Branch and Jump to Subroutine instructions. The instruction fetch unit 302 contains a 16-entry queue of prefetched instructions for the current execution stream and an eight-entry queue of prefetched instructions for the Branch target stream. The instruction fetch unit 302 receives across a 256-bit-wide bus up to eight instructions from the instruction cache in a cycle. The instruction decoder and issuer 304 decodes and schedules all instructions executed by the co-processor 204. The decoder processes one instruction in a cycle in the order of receipt from the instruction fetch unit 302, while the issuer schedules most instructions out-of-order depending on both the execution resource and operand data availability.

Figure 4:
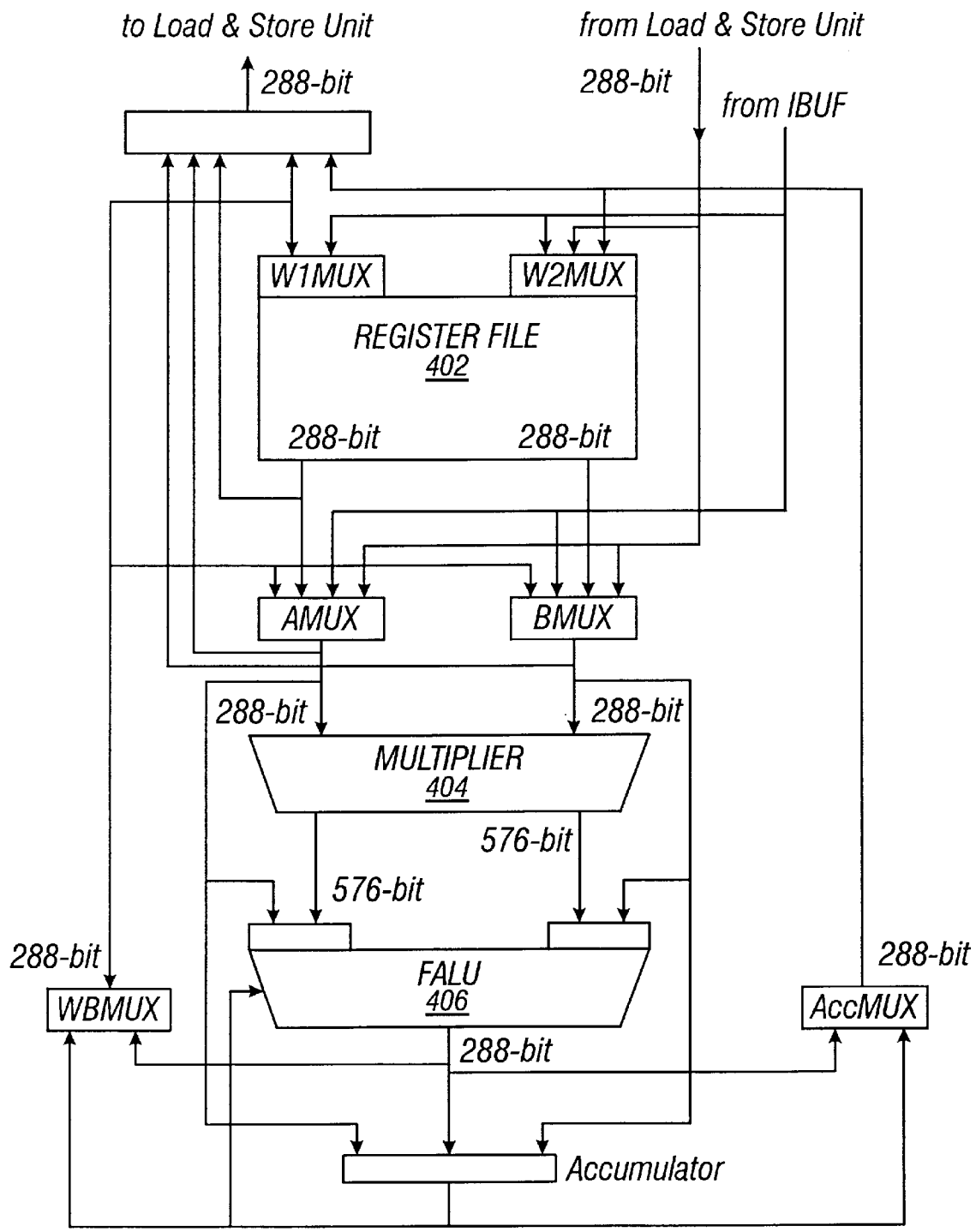
FIG. 4 is a is a schematic block diagram showing co-processor execution data paths of the co-processor illustrated in FIG. 3.

Referring to FIG. 4, the instruction execution data path 306 includes a four-port register file 402, eight 32×32 parallel multipliers 404, and eight 36-bit ALUs 406. The register file 402 supports two read operations and two write operations per cycle. The parallel multipliers 404 produce up to eight 32-bit multiplications in integer or floating point format, or sixteen 16-bit multiplications or thirty-two 8-bit multiplications per cycle. The ALUs 406 execute either eight 36-bit ALU operations in integer or floating point format, sixteen 16-bit ALU operations, or thirty-two 8-bit operations per cycle (for example, 12.5 ns).

The register file 402 includes a plurality of special-purpose registers and a plurality of return address registers. The special-purpose registers include a vector control and status register (VCSR), a vector program counter (VPC), a vector exception program counter (VEPC), a vector interrupt source register (VISRC), a vector and control processor synchronization register (VASYNC) and other registers such as various count, mask, overflow and breakpoint registers. The vector program counter (VPC) is the address of the next instruction to be executed by the co-processor 204.

The vector interrupt source register (VISRC) indicates the interrupt sources to the processor 202. Appropriate bits of VISRC are set by hardware upon detection of exceptions. The bits are reset by software before execution of the co-processor 204 resumes. Any set bit in the VISRC causes the co-processor 204 to enter an idle state (VP_IDLE). If the corresponding interrupt enable bit is set in a VIMSK register in the co-processor interface 206, an IRQ interrupt is signaled to the processor 202.

The co-processor 204 detects exception conditions including precise exceptions and imprecise exceptions. Precise exceptions are detected by the co-processor 204 and reported prior to the faulting instruction. Precise exceptions include an instruction address breakpoint exception, a data address break-point exception, an invalid instruction exception, a single-step exception, a return address stack overflow exception, a return address stack underflow exception, a VCINT exception, and a VCJOIN exception. Imprecise exceptions of the co-processor 204 are detected and reported after execution of a variable number of instructions that are later in program order to the faulting instruction. Imprecise exceptions include an invalid instruction address exception, an invalid data address exception, an unaligned data access exception, an integer overflow exception, a floating point overflow exception, a floating point invalid operand exception, a floating point divide by zero exception, and an integer divide by zero exception.

The vector interrupt instruction register (VIINS) is updated with co-processor VCINT or the VCJOIN instruction when the instruction is executed to interrupt the processor 202.

The processor 202 initiates operations of the co-processor 204. For more information regarding processor 202 initiation operations of co-processor 204, please refer to the co-pending and concurrently filed U.S. Patent application co-pending and concurrently filed U.S. Patent application Ser. No. 08/699,295 of Song et al., entitled "System And Method For Handling Software Interrupts With Argument Passing" and Ser. No. 08/699,294 of Song et al., entitled "system And Method For Handling Interrupt And Exception Events In An Asymmetric Multiprocessor Architecture" which are incorporated herein by reference in their entirety.

The vector interrupt mask register (VIMSK) controls reporting of exceptions occurring within the co-processor 204 to the processor 202. The bits in VIMSK, when set along with a corresponding bit in the vector interrupt source (VISRC) register, enable the exception to interrupt the processor 202. The VISRC register includes a plurality of bits indicating which source of a plurality of exceptions and interrupts. Bits of the VIMSK register include a Data Address Breakpoint Interrupt enable (DABE), an instruction address breakpoint interrupt enable (IABE), and a single-step interrupt enable (SSTPE). The VIMSK further controls floating point overflow (FOVE), invalid operand (FINVE) and divide-by-zero (FDIVE) interrupt enable bits, and integer overflow (IOVE) and divide-by-zero (IDIVE) interrupt enable bits. The VIMSK also controls a VCINT interrupt enable (VIE), a VCJOIN interrupt enable (VJE), and a context switch enable (CSE).

The co-processor 204 interacts with the processor 202 by sending signals to the processor 202. Specifically, the co-processor 204 sends signals to the processor 202 indirectly via user-extended registers indicating that the co-processor 204 has executed a synchronizing instruction. The co-processor 204 also directly signals the processor 202 via an interrupt request indicating that the co-processor 204 has halted execution and entered the VP_IDLE state. The co-processor 204 executes two instructions for signaling the processor 202. A VCJOIN instruction (VCJOIN n) conditionally joins with the processor 202 and causes the co-processor 204 to halt and enter the VP_IDLE state. A program counter (not shown) in the co-processor 204 addresses the instruction following the VCJOIN instruction. The VCJOIN instruction, executed by the co-processor 204, is classified into a control flow class. The control flow instructions include various conditional instructions such as branch, decrement and branch, jump, return from subroutine, context switch, and barrier instructions.

Referring again to FIG. 2, the cache subsystem 208 includes a data cache 236 (for example, 5 KB), an instruction cache 238 (for example, 2 KB), and a cache ROM 240 (for example, 16 KB) and typically operates at the same speed as the co-processor 204 (80 MHz). In one embodiment, the cache subsystem 208 includes 1 Kbytes of instruction storage and 1 Kbytes of data storage for the processor 202, 1 Kbytes of instruction storage and 4 Kbytes of data storage for the co-processor 204, and a shared 16 Kbytes of integrated instruction and data cache ROM for both the processor 202 and the co-processor 204. The cache subsystem 208 interfaces to the processor 202 through 32-bit data buses and interfaces to the co-processor 204 through 128-bit data buses. The cache ROM 240 includes µROM initialization software, self-test diagnostics software, various system management software, library routines and a cache for selected instructions and data constants. Specifically, the cache ROM 240 includes an instruction exception handler and input and output device interrupt handlers 0, 1, 2, and 3 for the processor 202. The cache ROM 240 also includes a vector processor interrupt handler and a vector processor breakpoint exception handler which execute in the processor 202.

Figure 5:
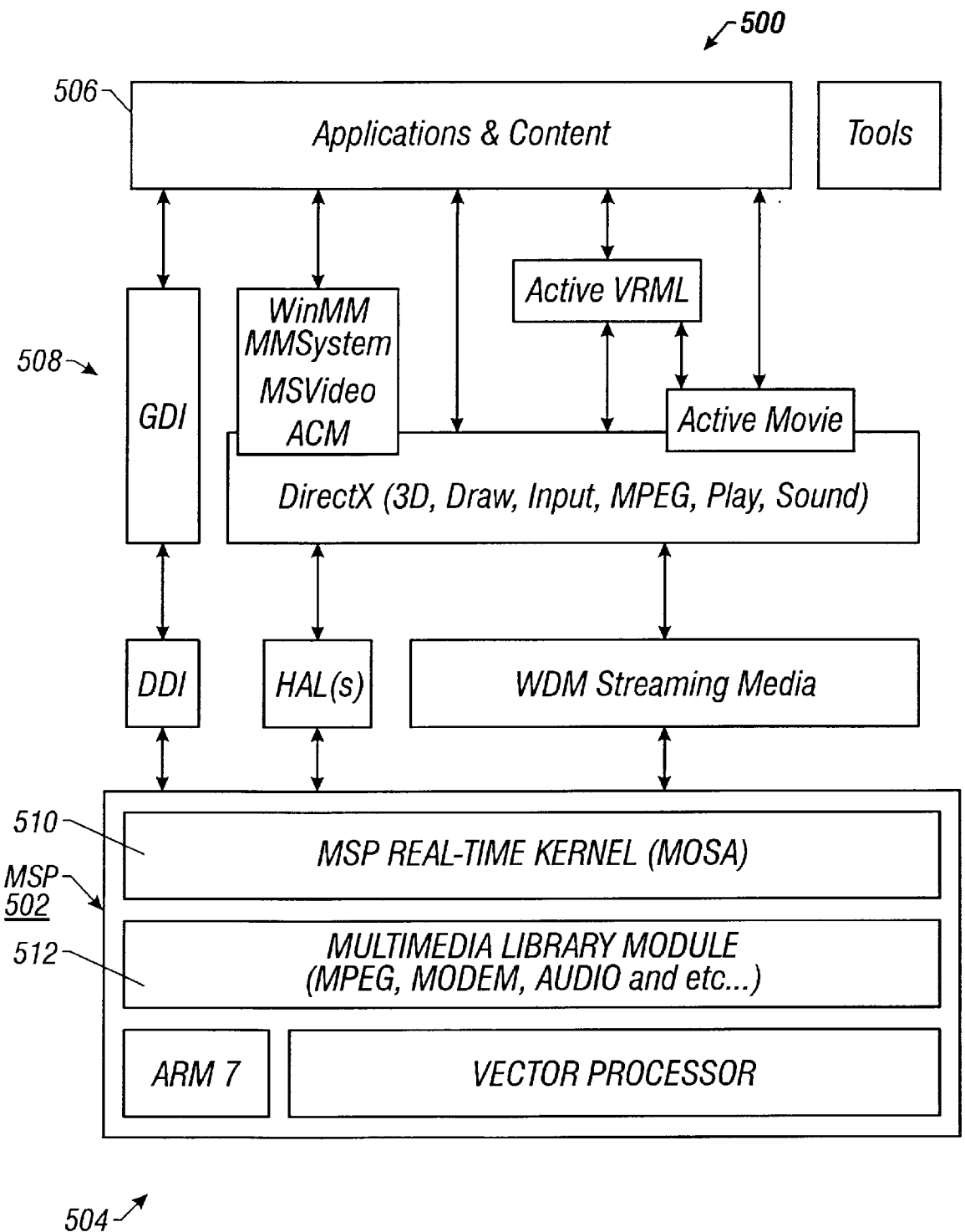
FIG. 5 is a schematic block diagram illustrating a firmware architecture of the multimedia signal processor.

Referring to FIG. 5, a schematic block diagram illustrates the software and firmware architecture 500 of the multimedia signal processor 200 including MSP system component software 502 executing on the multimedia signal processor 200 and PC applications and operating system software 508 executing on the host processor 102. The multimedia signal processor 200 is controlled by firmware including a vectorized-DSP firmware library 504 which executes on the co-processor 204 and a system management function block 506 which executes on the processor 202. The vectorized-DSP firmware library 504 and the system management function block 506 are included in MSP system component software 502. The architecture 500 advantageously separates signal processing functionality from host application control operations to simplify software development, improve software design management and reduce applications development and maintenance costs.

The MSP system component software 502 executes exclusively on the processor 202 and includes an MSP real-time operating system kernel 510, a multimedia library module 512, the system management function block 506 and the vectorized-DSP firmware library 504. The MSP real-time kernel 510, a subset of Microsoft Corp., MMOSA real-time Kernel, is typically responsible for interfacing to the host processor 102, resource management, I/O device handling and most interrupt and exception processing. The MSP real-time kernel 510 includes software for interfacing to Windows™ and Windows NT™ software executing in the host processor 102. The MSP real-time kernel 510 also includes software for selecting and downloading selected application firmware from the host processor 102, software for scheduling tasks for execution in the processor 202 and the vector processor 204, and software for managing system resources of the multimedia signal processor 200 including memory and I/O devices. The MSP real-time kernel 510 includes software for synchronizing communication between tasks of the multimedia signal processor 200 and software for reporting MSP-related interrupt, exception and status conditions.

The vectorized-DSP firmware library 504 performs substantially all digital signal processing functions. The a vectorized-DSP firmware library 504 also controls specific special interrupts such as a Co-processor Interrupt which is issued by the processor 202 to the vector processor 204, or a Hardware Stack Overflow Exception, which is generated within the vector processor 204.

The multimedia library module 512 performs communications-handling functions including data communication, MPEG video and audio, speech coding and synthesis, SoundBlaster™-compatible audio and the like. The MSP real-time kernel 510 is a real-time, robust, multitasking, pre-emptive operating system including enhancements which facilitate multimedia applications executing on the multimedia signal processor 200.

The PC applications and operating system software 508 executing in the host processor 102 controls the multimedia signal processor 200 by reading and writing MSP control and status registers via the system bus 106, and writing to shared data structures that are resident to the system memory 104 and resident to the multimedia signal processor 200.

MSP program execution begins with the processor 202 which executes a first execution stream. The processor 202 may initiate a second independent execution stream in the vector processor 204. Operations of the processor 202 and the vector processor 204 are synchronized through specific co-processor instructions that operate in the processor 202, including STARTVP, INTVP and TESTVP instructions, and special instructions executing in the vector processor 204, including VJOIN and VINT instructions. Data transfer between the processor 202 and the vector processor 204 are performed using data movement instructions executed in the processor 202.

The co-processor 204 interacts with the processor 202 by sending signals to the processor 202. Specifically, the co-processor 204 sends signals to the processor 202 indirectly via user-extended registers indicating that the co-processor 204 has executed a synchronizing instruction. The co-processor 204 also directly signals the processor 202 via an interrupt request indicating that the co-processor 204 has halted execution and entered the VP_IDLE state. The co-processor 204 executes two instructions for signaling the processor 202, a VCJOIN instruction and a VCINT instruction which (VCINTn) conditionally interrupts the processor 202, causing the co-processor 204 to halt and enter the VP_IDLE state. The VCINT and VCJOIN instructions are instructions executed by the co-processor 204 which are classified into a control flow class. The control flow instructions include various conditional instructions such as branch, decrement and branch, jump, return from subroutine, context switch, and barrier instructions.

The multimedia multiprocessor system 100 is described in further detail in co-pending and concurrently filed U.S. patent application Ser. No. 08/697,102 of L. Nguyen, entitled "Microprocessor Operation in a Multimedia Signal Processor", Ser. No. 08/669,597 of L. Nguyen, entitled "Single-Instruction-Multiple-Data Processing in a Multimedia Signal Processor", Ser. No. 08/697,086 of L. Nguyen et al., entitled "Single-Instruction-Multiple-Data Processing Using Multiple Banks of Vector Registers", and Ser. No. 08/699,585 of M. Mohamed et al., entitled "Single-Instruction-Multiple-Data Processing With Combined Scalar/Vector Operations" all of which are incorporated herein by reference in their entirety.

The multimedia signal processor 200 is capable of performing multitasking operations which involve successive execution of programs. The time required to context switch between programs may be reduced by reducing the amount of processor state information stored, relative to conventional storage of all processor state information, needed to successfully restore the program being context switched out. By reducing the amount of stored processor information during a context switch, the resources may be used more efficiently, as discussed below.

Figure 6:
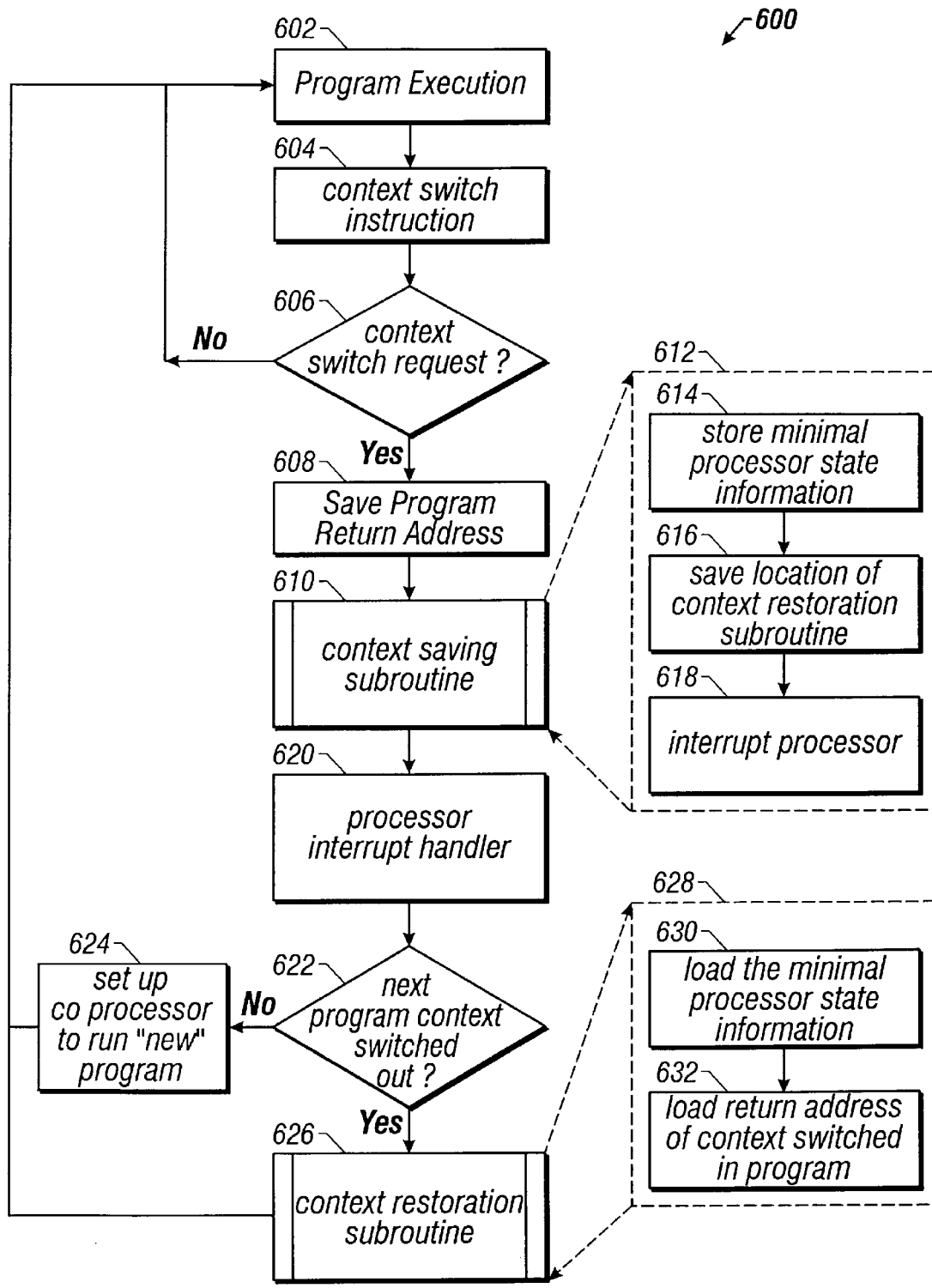
FIG. 6 is a flow chart illustrating operations related to efficient program context saving and program restoring in a multiprocessor architecture.

FIG. 6 illustrates an embodiment of an efficient context process flow 600 (context saving/restoring process flow 600) which is illustratively employed by the multimedia multiprocessor system 100 and particularly using a multimedia signal processor 200 chosen from any of the multimedia signal processors of the Samsung MSP family. The context saving/restoring process flow 600 begins with program execution block 602. In program execution block 602, co-processor 204 (FIG. 2) executes a program, such as an application program. The application program includes markers interspersed by the programmer throughout the application program such that a marker is encountered on an approximately regular basis. In this embodiment, the marker is a conditional context switch instruction of co-processor 204 referred to as VCCS. At any point during the application program execution, the co-processor 204 includes processor state information associated with that point in the program currently being executed. At some points in the application program, less processor state information is required to successfully restore the application program following a context switch than at other points in the application program. The programmer, being aware of these "reduced processor state" points in the application program that preferably require preservation of a minimal amount of processor state information across a context switch, places the VCCS instruction at these reduced processor state points in the application program. However, the interval between encountered VCCS instructions should preferably not be so great as to noticeably delay a context switching operation. The interval will depend upon the judgment of the programmer, the application program, and the clock speed of the co-processor 204. An exemplary interval results in no more than a 2 μsec delay between a requested context switch and response to the request.

Reducing the amount of processor state information needed to successfully resume a program following a context switch can result in noticeable processor performance gains, especially when the potential size of the processor state information is very large. For example, any of the Samsung MSP family is an exemplary architecture having a very large amount of memory storage areas allocated to processor state information. The Samsung MSP includes over seven (7) Kbytes of processor state information and includes sixty four (64) two hundred and eighty eight (288) bit vector registers, over eighty (80) thirty two (32) bit scalar registers, and up to four (4) Kbytes of scratch pad memory. Performance increases associated with reducing the amount of processor state information transfer during both a context switch and subsequently during program restoration in an architecture such as the Samsung MSP can be substantial.

One example of a reduced processor state point in an application program involves an ADD instruction which determines the sum of 50 arguments. If the application program is context switched out prior to determining the sum of the arguments, the processor state information necessary to restore this application program must include all 50 arguments. However, if the ADD instruction is, completed and the sum determined, only the sum must be included as part of the processor state information. Therefore, the amount of processor state information necessary for resumption of the program upon a return to the program is reduced relative to saving all available processor state information. The VCCS instruction, which is the co-processor 204 conditional context switch instruction, is therefore placed in the application program at a point following determination of the sum of the 50 arguments. This is one example of an appropriate point in the application program for reducing the required processor state information to successfully context switching out and restoring the application program. It will be apparent to those of ordinary skill in the art after reading this description that many other points in application programs may be chosen to reduce the amount of processor state information storage in anticipation of context switching out and subsequently restoring a program.

Figure 7:
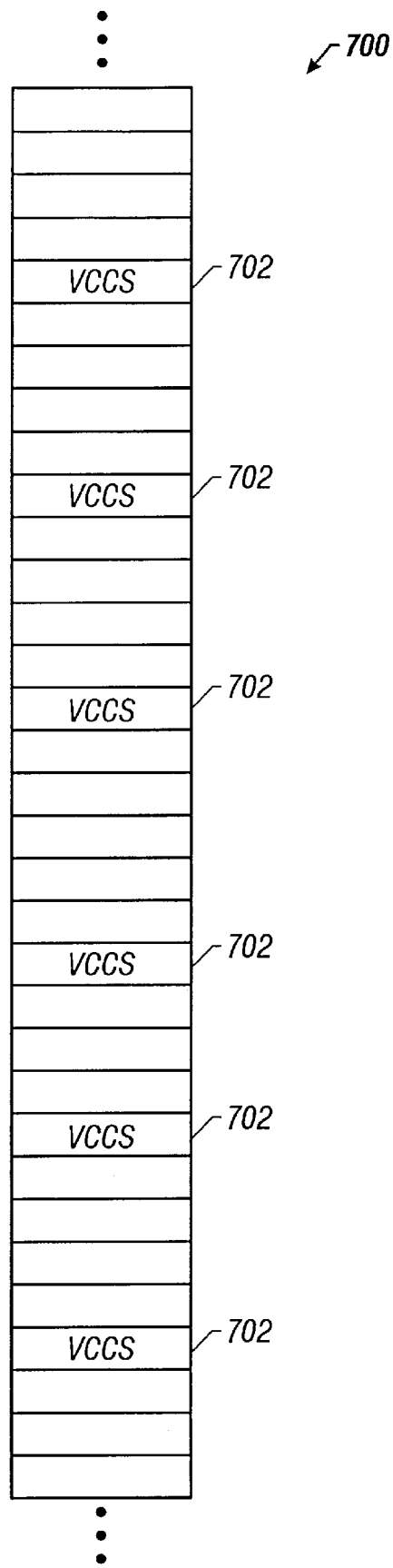
FIG. 7 is an illustrative executable program flow segment having interspersed conditional context switch instructions.

Referring to FIG. 7, an illustrative segment 700 of an application program includes interspersed VCCS instructions 702. The VCCS instructions 702 are generally regularly interspersed at predetermined locations requiring a minimal amount of processor state information storage in anticipation of successfully and seamlessly context switching in the application program.

Referring again to FIG. 6, during the execution of the application program in program execution block 602, a thirty-two (32) bit VCCS instruction will be encountered at the appropriate point as shown in context switch instruction block 604. Proceeding to context switch request block 606, the VCCS instruction causes the co-processor 204 to determine whether or not processor 202 has requested that the currently executing application program be context switched out and replaced with another program. If a context switch has not been requested context saving/restoring process flow 600 returns to program execution block 602 and continues executing the application program beginning at the point following the encountered VCCS instruction.

In order to request a context switch, the processor 202 writes to a thirty-two (32) bit vector processor interrupt mask register 208, referred to as the VIMSK register, located in co-processor interface 206. Specifically, processor 202 sets bit zero (0), which is the CSE or context switch enable bit, of VIMSK register 214 by writing a one (1) to the CSE bit. For more information on the VIMSK register, see co-pending and concurrently filed U.S. patent application Ser. No. 08/699,295 of Song et al., entitled "System And Method For Handling Software Interrupts With Argument Passing" and Ser. No. 08/699,294 of Song et al., entitled "System And Method For Handling Interrupt And Exception Events In An Asymmetric Multiprocessor Architecture."

Table 1 sets forth the VCCS instruction format as used in the Samsung MSP vector processor.

TABLE 1

| CT | 1 | 1 | 1101 | | Offset <22:0> |
|----|---|---|------|---|---------------|
| 30 | | | | 25 | 20  15  10  5  0 |

The VCCS format includes bits 111101 in the most significant bit positions and includes an Offset field in the least significant twenty-three (23) bits. The Offset field identifies a context saving subroutine location to which the co-processor 204 will branch upon successful completion of the VCCS instruction if a context switch has been requested. Bits (25:23) are unused by the VCCS instruction. The assembler syntax of the VCCS instruction is VCCS #Offset.

Referring to context switch request block 606, to determine whether or not processor 202 has requested that the currently executing application program in program execution block 602 be context switched out and replaced with another program, the encountered VCCS instruction causes co-processor 204 to read the VIMSK register 214. Assuming the VCCS instruction does not cause an exception, if the CSE bit of the VIMSK register 214 is set to a one (1), the return address of the application program in program execution block 602 is saved onto a soft return address stack uniquely associated with the program being context switched out The current address of the application program is located in the vector program counter (VPC). The return address equals VPC plus four (4).

Note that the co-processor 204 does not check for a requested context switch from processor 202 until a VCCS instruction is encountered. As a result, the programmer can control the point at which an executing program may be context switched out. Furthermore, although there may be a delay between a requested context switch and a corresponding response, no program execution penalties are incurred because the application program continues to execute during any context switch request, detection, and response delay.

The following pseudocode sets forth the operation of VCCS:

```
If(VIMSK<CSE> == 1){
    if(VSP<4> > 15) {
        VISRC<RASO> = 1; signal processor 202 with
        RASO exception;
        VP_STATE = VP_IDLE;
    } else {
        RSTACK[VSP<3:0>] = VPC + 4;
        VSP<4:0> = VSP<4:0> + 1;
        VPC = VPC + sex(Offset<22:0> * 4);
    }
} else VPC = VPC + 4;
```

Referring to context switch request block 606, the VCCS instruction thus causes the co-processor 204 to determine whether or not the CSE bit of VIMSK register 214 is set. If the bit is not set, processor 202 has not requested a context switch, and the co-processor 204 program counter (VPC) is incremented to the next instruction and a return is made to program execution block 602. If the processor 202 has requested a context switch, co-processor 204 examines bit four (4) of the five (5) bit vector stack pointer (VSP) associated with the application program and determines whether execution of the VCCS instruction will result in a stack overflow. If a stack overflow will occur, the Return Address Stack Overflow exception bit of the Vector Interrupt Source Register (VISRC) is set to one (1), and the co-processor 204 state (VP_STATE) is placed in an idle state (VP_IDLE). If a stack overflow will not occur, context saving/restoring process flow 600 advances to save return address block 608, and the co-processor 204 saves the return address of the application program executing in program execution block 602 and increments the soft stack pointer. VPC is then loaded with the sign extended address indicated by the VCCS Offset field. The address now stored in VPC is the address of the context saving subroutine shown in the context saving subroutine block 612.

The co-processor 204 next branches to the context saving subroutine using the context saving subroutine address in VPC as shown in the execute branch to context saving subroutine block 610. The context saving subroutine 612 is written by the programmer of the application program executed in program execution block 602. As a result, the programmer is aware of the minimal amount of processor state information that needs to be stored for successfully resuming the context switched out application program. As shown in the store minimal processor state information sub-block 614, the context saving subroutine 612 saves only the required information present in, for example, registers and scratch pad memory, that will be necessary to restore the context switched out program.

Advancing to the save location of context restoration subroutine sub-block 616, co-processor 204 ends the context saving subroutine 612 by executing a thirty-two (32) Conditional Join with processor 202 task instruction, referred to as VCJOIN. Table 2 sets forth the VCJOIN instruction format as used in the Samsung MSP vector processor.

TABLE 2

| | 30 | | | | 25 | | 20 | 15 | 10 | 5 | 0 |
|---|---|---|---|---|---|---|---|---|---|---|---|
| CT | 1 | 0 | 0110 | | Cond | | | Offset <22:0> | | | |

The VCJOIN format includes bits 100110 in the most significant bit positions and includes a condition field in bits (25:23) and an Offset field in the least significant twenty-three (23) bits. The condition field is set to unconditionally interrupt processor 202. The Offset field identifies an address of a context restoring subroutine location which co-processor 204 will execute upon resumption of the context switched out program. The assembler syntax of the VCJOIN instruction is VCJOIN.cond #Offset.

The following pseudocode sets forth the operation of VCJOIN:

```
If(Cond = un){
    VISRC<VJP> == 1;
    VIINS = [VCJOIN.cond #Offset instruction];
    VEPC = VPC;
    if (VIMSK<VJE> = 1; signal processor 202
    interrupt;
    VP_STATE = VP_IDLE;
}
else VPC = VPC + 4;
```

Referring to save location of context restoration subroutine sub-block 616, execution of the VCJOIN.un #Offset instruction by co-processor 204 causes the location of the context restoration subroutine 628 to be saved and interrupts processor 202 so that processor 202 may set up co-processor 204 for execution of a subsequent program. In the save location of context restoration subroutine sub-block 616, the VCJOIN condition is set to unconditional, and a VCJOIN Interrupt Enable (VJE) bit of the VIMSK register 214 is also set to (1). The VJE bit is bit five (5) of the VIMSK register 214. Referring to the save location of context restoration subroutine sub-block 616, the twenty-three (23) bit Offset field of the VCJOIN instruction is set to indicate a location of the context restoration subroutine 628.

When the VCJOIN instruction is executed by co-processor 204 in the interrupt processor sub-block 618, co-processor 204 checks the condition field of the VCJOIN instruction to verify that the unconditional status of the condition field. Subsequently, the co-processor 204 sets the exception pending bit (VJP) of the thirty-two (32) bit Vector Interrupt Source Register (VISRC) to one (1). The VJP bit is bit five (5) of the VISRC register. A Vector Interrupt Instruction Register 1 (VIINS) is updated with the VCJOIN instruction since the VCJOIN instruction is being executed to interrupt the processor 202. The current VPC is stored in a Vector Exception Program Counter (VEPC). The VEPC specifies the address of the instruction that is most likely to have caused the most recent exception. As execution of the VCJOIN instruction continues, the VJE bit of VIMSK register 214 is evaluated and determined to be set to one (1). Setting of the VJE bit causes an IRQ interrupt of processor 202, and setting of the VJP bit causes co-processor 204 to enter the IDLE state.

The context saving/restoring process flow 600 exits the context saving subroutine block 612 and advances to the processor interrupt handler block 620. The processor 202 handles the interrupt as described in co-pending and concurrently filed U.S. patent application Ser. No. 08/699,295 of Song et al., entitled "System And Method For Handling Software Interrupts With Argument Passing" and Ser. No. 08/699,294 of Song et al., entitled "System And Method For Handling Interrupt And Exception Events In An Asymmetric Multiprocessor Architecture."

After handling the VCJOIN initiated interrupt, processor 202, as shown in the next program context switched out decision block 622, determines whether or not the next program to be executed is a "new" program, i.e. a program not previously context switched out or a program previously switched out The multimedia signal processor 200 operating system (FIG. 5) keeps track of programs and whether or not they have been previously context switched out. If the next program to be executed by co-processor 204 is "new", context saving/restoring process flow 600 advances to the set up co-processor to run new program block 624. The processor 202 sets up co-processor 204 to run the "new" program, and context saving/restoring process flow 600 returns to program execution block 602 where the "new" program is executed.

Returning to the next program context switched out decision block 622, co-processor 204 enters the branch to context restoration subroutine block 626 if the next program was previously context switched out. Processor 202 then loads VPC of co-processor 204 with the address of the context restoration subroutine 628, which was saved during the VCJOIN instruction execution in the save location of context restoration subroutine sub-block 616 as described above, and the context saving/restoring process flow 600 branches to the context restoration subroutine 628.

The context restoration subroutine 628 is written by the programmer of the application program now being context switched in. As a result, the programmer is aware of the location of the minimal amount of processor state information that was previously stored by context saving subroutine 612 in anticipation of successfully resuming the context switched out and now context switched in application program. The context saving/restoring process flow 600 advances to load the minimal processor state information sub-block 630 where the co-processor 204 proceeds to lead the previously stored minimal amount of processor state information in the appropriate co-processor 204 memory locations, for example, in the previously described registers and scratch memory.

Having loaded the processor state information necessary for the successful resumption of the context switched in application program, the context restoration subroutine 628 prepares co-processor 204 to run the context switched in application program at the precise program location that was previously saved in save location of context restoration subroutine sub-block 616. To restore this application program location, co-processor 204 executes Conditional Return From Subroutine (VCRSR) instruction which ends context restoration subroutine 628. Table 3 sets forth the VCJOIN instruction format as used in the Samsung MSP vector processor.

TABLE 3

| CT | 30 | | | 25 | 20 | 15 | 10 | 5 | 0 |
|---|---|---|---|---|---|---|---|---|---|
| | 1 | 0 | 0101 | Cond | | | | | |

The VCRSR format includes bits 100101 in the most significant bit positions and includes a condition field in bits (25:23). The least significant twenty-three (23) bits are not used and may be set to any value. The condition field is set to unconditionally interrupt processor 202. The assembler syntax of the VCRSR instruction is VCRSR.cond.

The following pseudocode sets forth the operation of VCRSR:

```
If(Cond = un){
    if(VSP<4:0> == 0) {
        VISRC<RASU> = 1;
        signal processor 202 with RASU exception;
        VP_STATE = VP_IDLE;
    } else {
        VSP<4:0> = VSP<4:0> - 1;
        VPC = RSTACK[VSP<3:0>];
        VPC<1:0> = b'00;
    }
} else VPC = VPC + 4;
```

Referring to load return address of context switched in program block 632, execution of the VCRSR.un instruction causes co-processor 204 to resume execution of this context switched in program from the location previously stored in save return address block 608. During execution of the VCRSR.un instruction, co-processor 204 determines that an unconditional branch is requested by examining the VCRSR instruction condition field which contains an unconditional branch code. The VSP examined due to execution of the VCRSR instruction is a soft stack pointer that is uniquely associated with the program being context switched in. Co-processor 204 next examines the VSP to determine whether or not VSP is pointing to its least significant location. If the VSP is pointing to its least significant location, the VISRC register RASU bit is set to one (1). The RASU bit is the Return Address Stack Underflow exception bit and, when set, signals processor 202 that an exception exists, and co-processor 204 enters the idle state. If the VSP is not pointing to its least significant location, co-processor 204 decrements VSP by one (1) location and loads VPC with the address stored at this selected VSP location. This VSP location contains the return address previously stored in save return address block 608. The VPC<1:0>=b'00 step insures that the least significant two (2) bits of the VPC are loaded with zeroes.

After the return address is loaded in VPC, context/switching process flow 600 returns to program execution block 602 where the now context switched in program begins execution. The context saving/restoring process flow 600 repeats until program execution is terminated.

As is evident from the foregoing, efficiency of context switching in a multi-tasking multiprocessor environment is improved by the context switching process flow 600. By saving only the minimal amount of processor state information while context switching out a program, valuable co-processor 204 time may be used for other operations. Furthermore, restoring only a minimal amount of processor state information allows a program to be efficiently context switched in. These time savings accumulate during context switching operations performed.

While the invention has been described with respect to the embodiments and variations set forth above, these embodiments and variations are illustrative and the invention is not to be considered limited in scope to these embodiments and variations. For example, specific hardware and software embodiments are exemplary and many other system architectures and/or software embodiments may implement the context switching and restoring features described herein. Furthermore, it will be apparent to those of ordinary skill in the art after reading this disclosure, that the context switching and restoring features may be utilized in multi-tasking environments involving more than two tasks. Accordingly, various other embodiments and modifications and improvements not described herein may be within the spirit and scope of the present invention, as defined by the following claims.

What is claimed is:

1. A process comprising:
   executing a first program on a first processor;
   receiving a context switch request from a second processor;
   responding to the context switch request at an appropriate point in the first program, the appropriate point being one of a plurality of predetermined points indicated by a plurality of markers in the first program, the plurality of predetermined points including selected predetermined points located at a proximate point in the first program that is predetermined to be a point in which the first processor requires a minimal amount of processor state information storage for successful restoration of the first program;
   continuing to execute the first program after receiving the context switch request; wherein the responding comprises:
      encountering the marker in the first program at the appropriate point;
      interrupting the first processor;
      reading the context switch request with the first processor in response to encountering the marker in the first program;
      storing a return address of the first program;
      storing the minimal amount of processor state information required for successful restoration of the first program; and
      notifying the second processor of the availability of the first processor to execute a second program.

2. A process as in claim 1 further comprising:
   interspersing a plurality of markers in the first program at locations requiring a minimal amount of processor state information storage for successful restoration of the first program.

3. A process as in claim 1 further comprising:
   saving the processor state information corresponding to a state of the first program at the appropriate point;
   switching out the first program;
   executing a second program on the first processor;
   switching out the second program; and
   restoring the first program using the minimal amount of stored process information.

4. A process as in claim 1 wherein the responding comprises:
   saving the processor state information corresponding to a state of the first program at the appropriate point; and
   saving the location of a context restoration routine for seamlessly restoring the first program.

5. A process as in claim 1 wherein the executing step comprises:
   executing the first program on a vector processor of a multi-media signal processor in a multimedia multi-processor system.

6. A process as in claim 1 further comprising:
   receiving data from a plurality of multi-media devices; and
   wherein the executing comprises:
      processing the received data.

7. A process as in claim 1 wherein the receiving comprises:
   reading a register having a context switch enable field set by the second processor.

8. A process as in claim 1 wherein the marker is a conditional context switch instruction.

9. A computing system comprising:
   a first processor in a multi-tasking environment for executing programs having respective pluralities of interspersed context switch markers, the pluralities of interspersed context switch markers being located in the programs at predetermined points, the predetermined points including points determined to be proximate to locations in which the first processor requires a minimal amount of processor state information storage for successful restoration of the programs;
   a first memory, coupled to the first processor, allocated to storage of processor state information;
   a second memory coupled to the first processor;
   a context switch request detector operating on the first processor for detecting, after the processor encounters one of the markers in an executing program, a request to context switch out the program; and
   a context saving module operating on the first processor for responding to a detected context switch request by saving in the second memory processor state information located in the first memory, wherein the contest saving module includes:
      a module being operable to encounter the marker in the first program at the appropriate point;
      a module operable to interrupt the first processor;
      a module operable to read the context switch request with the first processor in response to encountering the marker in the first program;

a module operable to store a return address of the first program;

a module operable to store the minimal amount of processor state information required for successful restoration of the first program; and a module operable to notify the second processor of the availability of the first processor to execute a second program.

10. A computing system as in claim 9 wherein the context saving module further responds to the detected context switch by saving a location of a context restoration module.

11. A computing system as in claim 9 further comprising:

a second processor mutually coupled to the first processor, the first and second processors having asymmetric characteristics, the second processor including a mechanism for requesting the first processor to context switch out an executing program.

12. A computing system as in claim 11 further comprising:

an interface unit coupled between the first and second processors, the interface unit including a register mutually accessible by the first and second processors;

wherein the second processor is capable of writing to the register to indicate a context switch request; and wherein the first processor is capable of reading the register to detect a context switch request from the second processor.

13. A computing system as in claim 11 wherein:

the second processor is a control processor; and the first processor is a vector processor.

14. A computing system as in claim 9 further comprising:

a context restoring module operating on the first processor for restoring a context switched out program by returning to the first memory the saved processor state information located in the second memory associated with the context switched out program.

15. A computing system as in claim 9 wherein the markers are generally regularly interspersed throughout the program at locations which require a minimal of processor state information to successfully restore the program.

16. A computing system as in claim 9 wherein the markers are conditional context switch instructions.

17. An efficient context saving process in a multi-tasking, multiprocessor computing system environment, comprising:

inserting conditional context switch instructions into a first program at a plurality of predetermined points in the first program;

executing the first program;

receiving a context switch request;

detecting one of the conditional context switch instructions;

determining whether the context switch request exists from a first processor following the detecting one of the conditional context switch instructions; and switching out the first program comprising:

saving a return address of the program upon determining the existence of a context switch request, otherwise continuing to execute the first program; and executing a context saving module, comprising:

storing processor state information corresponding to a state of the first program prior to detecting the conditional context switch instruction;

saving a location of context restoration module;

interrupting the first processor, continuing to execute the first program after receiving the context switch request; wherein the first proven responds to the context switch, the responding comprises:

encountering the marker in the first program at the appropriate point;

interrupting the first processor;

reading the context switch request with the first processor in response to encountering the marker in the first program;

storing a return address of the first program;

storing the processor state information required for successful restoration of the first program; and notifying a second processor of the availability of the first processor to execute a second program.

18. A process as in claim 17 further comprising:

switching in the program comprising:

executing a context restoration module, comprising:

loading the processor state information previously stored in the context saving module executing step; and loading the saved return of the program previously saved in the program switching out step; and executing the program.

19. A process as in claim 17 further comprising:

executing the program on a co-processor; and submitting the context switch request from a control processor to an interface unit.

20. A process as in claim 17 wherein the inserting conditional context switch instructions into a program comprises:

inserting the conditional context switch instructions approximately regularly throughout the program so that the conditional context switch instructions are inserted at locations in the program that require a minimal amount of processor state information preservation in anticipation of context switching in the program.

21. A process as in claim 20 wherein the inserting further comprises:

inserting the conditional context switch instructions at approximately regular intervals so that noticeable delays are avoided between the steps of receiving the context switch request and detecting one of the conditional context switch instructions.

22. A process as in claim 17 wherein the executing a program comprises executing the program on a first processor, the process further comprising:

approximately regularly interrupting the first processor upon detecting one of the conditional context switch instructions.

23. A process as in claim 1 wherein the proximate point in the first program is a point in the first program so that noticeable delays are avoided between the receiving a context switch request and responding to the context switch request.

* * * * *